US005163115A

United States Patent [19]

Sheu

[11] Patent Number: 5,163,115
[45] Date of Patent: Nov. 10, 1992

[54] CABLES SUCH AS OPTICAL FIBER CABLES INCLUDING SUPERABSORBENT POLYMERIC MATERIALS WHICH ARE TEMPERATURE AND SALT TOLERANT

[75] Inventor: Jim J. Sheu, Dunwoody, Ga.

[73] Assignee: AT&T Bell Laboratories, Murray Hill, N.J.

[21] Appl. No.: 785,601

[22] Filed: Oct. 30, 1991

[51] Int. Cl.5 .............................................. G02B 6/44
[52] U.S. Cl. ........................................ 385/100; 528/71
[58] Field of Search .................................. 385/100–114; 525/327.8, 328.9, 330.2; 526/272, 318.1, 318.41, 318.43, 318.45, 930; 528/71

[56] References Cited

U.S. PATENT DOCUMENTS

| | | | |
|---|---|---|---|
| 2,316,128 | 4/1943 | Bock et al. | 260/209 |
| 2,316,129 | 4/1943 | Bock et al. | 260/209 |
| 3,425,971 | 2/1969 | Gugliemelli et al. | 260/17.4 |
| 3,661,815 | 4/1972 | Smith et al. | 260/17.4 |
| 4,059,552 | 11/1977 | Zweigle et al. | 260/29.6 |
| 4,172,066 | 10/1979 | Zweigle et al. | 260/29.6 |
| 4,366,294 | 12/1982 | Williams et al. | 525/327.6 |
| 4,401,795 | 8/1983 | Herman et al. | 525/327.8 |
| 4,622,263 | 11/1986 | Ando et al. | 428/288 |
| 4,649,164 | 3/1987 | Scott et al. | 521/149 |
| 4,921,904 | 5/1990 | Sparapany et al. | 525/329.9 |

OTHER PUBLICATIONS

Dkock, et al., *Review of Synthetic And Starch-Graft Copolymer Superabsorbents*, Insight '83 Absorbent Products Conf., San Antonio, Tex, 11/16–17/83.

Sheu, et al., *Design And Synthesis of Shale Stabilizing Polymers for Water-Based Drilling Fluids*, 63rd Annual Tech. Conf. and Exhibition of the Society of Petroleum Engineers, Houston, Tex., Oct. 2–5, 1988.

*Primary Examiner*—John D. Lee
*Assistant Examiner*—John Ngo
*Attorney, Agent, or Firm*—E. W. Somers

[57] ABSTRACT

A cable (20) includes a waterblocking member (29) which includes a superabsorbent polymer. The superabsorbent polymer includes an ionic constituent which is characterized in that its solubility product is substantially higher than that of carboxylate and in that it has a lower reaction rate for forming an anhydride than does carboxylate. The ionic constituent may be selected from the group consisting of sulfate, sulfonate and phosphate and also includes a counter ion. Other constituents may include a carboxylate and a non-ionic group constituent. The superabsorbent polymer is such that the amount of crosslinking is sufficient to avoid the polymer going into solution, but is not so much as to affect adversely the water absorbency of the waterblocking member. Further, the superabsorbent polymer is much more salt tolerant and temperature tolerant than are prior art superabsorbent polymers.

36 Claims, 3 Drawing Sheets

D>>d, X-LINKING ↑     WATER ABSORBENCY ↓

------ INTRAMOLECULAR HYDROGEN BOND
xxxxxx INTERMOLECULAR HYDROGEN BOND

ANHYDRIDE FORMATION (UPSETS THE OPTIMUM X-LINKING, LOSS OF IONIC ELECTROLYTES)

WHERE COUNTER ION $M^{\oplus} = NH_4^{\oplus}$, AMMONIUM CARBOXYLATE HAS LESS IONIC PROPERTY DUE TO LOWER DISASSOCIATION CONSTANT

SULFONATES

CABLES SUCH AS OPTICAL FIBER CABLES INCLUDING SUPERABSORBENT POLYMERIC MATERIALS WHICH ARE TEMPERATURE AND SALT TOLERANT

TECHNICAL FIELD

This invention relates to cables such as optical fiber cables which include superabsorbent polymeric materials that are temperature and salt tolerant. More particularly, this invention relates to cables such as optical fiber cables which include waterblocking tapes, filling compounds and other materials, comprising superabsorbent polymers which retain their superabsorbent capability notwithstanding exposure to temperature cycling and/or salt solutions.

BACKGROUND OF THE INVENTION

In the cable industry, it is well known that changes in ambient conditions lead to differences in vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High moisture levels inside a cable sheath system may have a detrimental effect on the transmission characteristics of the cable.

Furthermore, water may enter the cable because of damage to the cable which compromises its integrity. For example, lightning or mechanical impacts may cause openings in the sheath system of the cable to occur, allowing water to enter, and, if not controlled, to move longitudinally along the cable into splice closures.

Lately, optical fiber cables have made great inroads into the communications cable market. Although the presence of water itself within an optical fiber cable is not detrimental to its performance, passage of the water along the cable interior to connection points, terminals or associated equipment may cause problems and should be prevented. Further, in some climates, the development of ice within an optical fiber cable may have a crushing influence on the optical fibers in the core which may affect adversely the attenuation thereof.

In the prior art, various techniques have been used to prevent the ingress of water through the sheath system of a cable and into the core. Presently, many commercially available cables also include a water-swellable tape. The tape is used to prevent the travel of water through the sheath system and into the core as well as its travel longitudinally along the cable to closures and termination points, for example. Such a tape generally is laminated, including a water-swellable powder which is trapped between two polyester tapes. The water-swellable powder comprises a superabsorbent polymer (SAP).

Superabsorbent polymer materials generally are made in several ways which result in crosslinked polyacrylates, the major functional groups of which are carboxylate groups. Superabsorbent polymers may be made through a process of a crosslinking water-soluble polymers. Crosslinking renders the polymers insoluble in water and forms a matrix in which water is absorbed and retained. The amount of crosslinking is important and must be maintained at an optimum level depending on the application, such as the rate of water absorption and the total amount of water absorbed, for example. The amount of crosslinking determines the space in the network (matrix) of the superabsorbent polymer and thus the total volume of superabsorbent polymer, which in turn influences the density of functional groups in the network.

The mechanism by which a superabsorbent polymer absorbs and retains water can be described in two ways, physical and chemical. On the physical level, aqueous fluid wets the surface of the superabsorbent polymer and is physically distributed into and throughout the network of the superabsorbent polymer.

Chemical absorbency occurs on the molecular level. The aqueous fluid interacts with polymer chains. A carboxylate group will absorb water through a mechanism which is referred to as hydrogen bonding. The bulk of fluid chemically bonded to the superabsorbent polymer does not easily escape out of the network of the superabsorbent polymer.

Currently used superabsorbent polymers are not effective in a physiologically saline solution of about 0.9% NaCl or sea water due to the molecular structure of presently used superabsorbent polymers which have predominately carboxylate groups. For example, water absorbency drops from about 900 ml/g to 70 ml/g in a 0.9% NaCl solution and to 8 ml/g in a synthetic sea water solution.

The reasons why prior art superabsorbent polymers will not work well in a sea water environment, for example, are twofold. Carboxylates are sensitive to sodium chloride or other electrolytes. As a result, the water absorbing capability of prior art superabsorbent polymers decreases substantially when the polymers are exposed to salt.

The reason for such decrease may be explained in terms of a parameter termed osmotic pressure. Osmotic pressure is one of the mechanisms by which superabsorbent polymers absorb water because superabsorbent polymers are polyelectrolytes. An osmotic pressure gradient between the network of superabsorbent polymer and the surrounding aqueous solution determines the absorbency of the superabsorbent polymer. The osmotic pressure gradient between the network of the superabsorbent polymer and the surrounding aqueous fluid drives water into the network of the superabsorbent polymer.

The reduced water absorbing capability when the polymers are exposed to salt occurs because of a drop in the osmotic pressure gradient between the network of superabsorbent polymers and the external salt solution. When the surrounding aqueous solution changes from distilled water (zero concentration in functional groups or electrolytes) to 0.9% NaCl and then to sea water (about 3% in various electrolytes), the concentration gradient decreases, thus causing the osmotic pressure gradient to decrease. The decrease in osmotic pressure gradient results in a decrease in absorbency of the superabsorbent polymer. Another reason for the reduction in water absorbing capability is an effect referred to as the common ion effect which also decreases the osmotic pressure.

Another reason for the substantial decrease in absorbency by prior art superabsorbent polymers in salt solutions is multivalent ion complexation. In a multivalent ion environment, the multivalent ion will complex with the carboxylates and limit polymer chain extension and charge repulsion between the carboxylate ions which in turn reduces water absorbency. A well known phenomena in water soluble polymer chemistry is referred to as salting-out. A carboxylate-containing water soluble polymer solution can be turned easily into a precipitation of polymer separated from aqueous solution by the addition of a multivalent ion such as calcium. Calcium and other multivalent ions exist in sea water in low concentrations. The multivalent charges on the calcium ion will attract and complex with carboxylates in polymer chains. In effect, the complexation of these polymer chains increase the molecular weight of the polymer which becomes insoluble in water and precipitates out of solution.

In the case of a carboxylate-containing superabsorbent polymer, the net effect of complexation of multivalent ions with carboxylates is crosslinking. The addition of such complexation or crosslinking upsets the optimum level of crosslinking introduced when superabsorbent polymers are made. Therefore, the absorbency of the superabsorbent polymer is altered accordingly. This occurs in addition to the aforementioned drop in osmotic pressure gradient when superabsorbent polymers are exposed to any salt solution, not necessarily multivalent salts.

Another property of superabsorbent polymers is the temperature tolerancy thereof. The repetitive application of heat energy to carboxylate groups, whether in highly humid or dry conditions, will form anhydrides. The formation of an anhydride from two carboxylate groups, in effect, is a crosslinking of polymer chains which, as mentioned hereinabove, can reduce the water absorbency of the superabsorbent polymer. In some cases, high temperature and/or high humidity will destroy the crosslinking of polymer chains, thus reducing the water absorbency of the superabsorbent polymers. In either case, the optimum level of crosslinking can no longer be maintained and, accordingly, the water absorbing property of the superabsorbant polymer is changed.

What is sought after and what seemingly is not available is a cable that includes a superabsorbent polymer or more which is effective notwithstanding exposure to salt solutions such as, for example, in cables which are deployed in sea water environments or in hygienic and agricultural products which are exposed to saline environments. Further, the sought after superabsorbent polymer which may be included in cables should be one which is substantially temperature insensitive.

SUMMARY OF THE INVENTION

The foregoing problems of the prior art have been overcome with cables of this invention which include salt tolerant (ST), temperature tolerant (TT) superabsorbent polymers. The superabsorbent polymer of this invention is not as sensitive to salt solutions as those of the prior art. A salt solution is intended to mean sea water, a physiological saline solution or an electrolyte solution. A cable of this invention includes a core comprising at least one communication transmission medium and a sheath system in which the core is disposed. The sheath system includes at least one waterblocking member which comprises a superabsorbent polymer which includes an ionic constituent which is characterized in that its solubility product, Ksp, is substantially higher than that of carboxylate and in that it has a lower reaction rate for forming an anhydride than does carboxylate. In a preferred embodiment, the ionic constituent is selected from the group consisting of sulfonate, phosphate and sulfate.

Included also is at least one counter ion such as ammonium, potassium, or cesium, for example. The use of such cations with carboxylate groups reduces the common ion effect when the superabsorbent polymers are exposed to saline water and, thus, will maintain their water absorbent properties.

The sought after salt tolerant, temperature tolerant superabsorbent polymer of the preferred embodiment includes some neutral groups such as amides, hydroxyls, nitriles or substituted amides. Such groups are not sensitive to salt but they are capable of hydrogen bonding with water. Further, inasmuch as amide, and substituted amide groups will not form anhydride or crosslink, a superabsorbent polymer which includes such groups is more temperature tolerant than those of the prior art.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
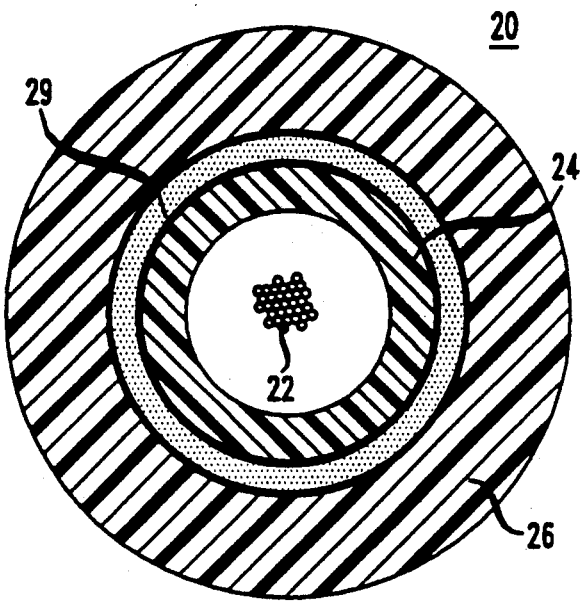
FIG. 1 is a perspective view of a cable which includes a superabsorbent polymer material.

Referring now to FIG. 1, there is shown an optical fiber cable which is designated generally by the numeral 20. The cable 20 includes a core comprising one or more optical fibers 22—22 which are disposed within a longitudinally extending tubular member 24 made of a plastic material and which commonly is referred to as a core tube. A plastic jacket 26 is disposed about the core tube with longitudinally extending strength members (not shown) disposed outside the core tube. Interposed between the core tube and the jacket is a layer 29 comprising a waterblocking member. The waterblocking member which functions to prevent substantially the longitudinal flow of water includes a superabsorbent polymeric material.

The superabsorbent polymer of the cable of this invention includes an ionic group or derivatives thereof and a counter ion. The ionic group includes an ionic constituent which is characterized by a solubility product, Ksp, that is substantially higher than that of carboxylate and in that it has a lower reaction rate for forming an anhydride than does carboxylate. In the preferred embodiment, the ionic constituent is selected from the group consisting of sulfonate, sulfate or phosphate. As a function, the ionic group absorbs water and is less sensitive to a salt solution as compared to a carboxyl group which typically has been used.

Included in the preferred embodiment is a primary ionic group selected from sulfonate, sulfate and phosphate, a counter ion, another or secondary ionic group which preferably is carboxylate and a non-ionic constituent. The non-ionic constituent may be hydroxyl, amide or nitrile or any of their derivatives. The carboxylate which also is sensitive to salt solutions may be included to absorb water because of its high hydrogen bonding ability. On the other hand, the non-ionic group is immune to salt solutions because it is non-ionic. One or all of the non-ionic grouping may be included to reduce sensitivity to salt concentration. The composition of each group will depend upon the desired sensitivity of the resulting superabsorbent polymer to a salt solution.

As mentioned hereinabove, it has been determined that a sulfonate, sulfate or phosphate constituent is suitable as the primary ionic constituent. This constituent of the superabsorbent polymer is characterized by a multivalent sensitivity which is less than that of carboxylates, which has less tendency to form an anhydride and which has less tendency to crosslink during the use of the superabsorbent polymer.

Also there is a substantial difference in the solubility product between carboxylate and members of the ionic group, such as sulfonate, for example. Some examples of solubility product, Ksp, of constituents are as follows:

| Calcium carbonate | $CaCO_3$ | $2.8 \times 10^{-9}$ |
| Calcium sulfate | $CaSO_4$ | $9.1 \times 10^{-6}$ |
| Magnesium carbonate | $MgCO_3$ | $3.5 \times 10^{-8}$ |
| Magnesium sulfonate | $MgSO_3$ | $3.2 \times 10^{-3}$ |

As is shown above, there is a substantial difference between the solubility product of carbonate, sulfate and sulfonate. Although the solubility product of carboxylate is not given, it is similar to that of carbonate. The smaller its solubility product, the easier it is for a constituent to come out of solution and precipitate. Similarly, when a superabsorbent polymer with predominating carboxylate groups encounters calcium or magnesium ions (such as in sea water), the complexation of carboxylates and the calcium and magnesium ions occurs readily due to the low solubility products of calcium or magnesium polyacrylates (carboxylates). This occurs less readily in the case of superabsorbent polymers with predominating sulfonate, sulfate or phosphate groups because of their higher solubility products.

In order to diminish salt sensitivity and to increase the rate of water absorbency of the superabsorbent polymer of this invention, a counter ion is included in the superabsorbent polymer. The function of the counter ion is to counter the negative charge of the primary ionic group hereinbefore described. Accordingly, in the preferred superabsorbent polymer of this invention, the concentrations of the ionic group and the counter ion are substantially equal. For example, if one mole of the ionic group is included, then the superabsorbent polymer includes one mole of a counter ion.

In the preferred embodiment, ammonium, potassium or cesium, rather than sodium is used as the counter ion. Whenever one of the hereinbefore-identified ionic groups is used, a counter ion is needed and that counter ion preferably should not be sodium in order to avoid the common ion effect present in sea water and in physiological saline solutions. What is not desired is an ion, e.g., sodium, which is present in sea water and in physiological saline solutions common to the environment in which superabsorbent polymers are used. Diapers, personal hygiene pads and incontinent products, where superabsorbent polymers may be used, encounter a physiological saline solution, while agricultural and cable applications of superabsorbent polymers may involve exposure to salt water, even sea water. A counter ion such as ammonium is preferred because it is characterized as less ionic than the sodium, potassium or cesium, and will be less sensitive towards salt solutions. Furthermore, when ammonium, for example, is used, surface wettability is increased. Counter ions other than those identified hereinbefore may be used.

Also, the combination of carboxylate groups with sulfate or sulfonate groups (e.g. vinyl sulfonate or, 2 acryl-amido-2-methyl propane sulfonate) will decrease the sensitivity of the superabsorbent polymer to salts while maintaining suitable water absorbency. This is a result of the difference between the disassociation constants of sulfonic or sulfate acids and carboxylic acids, and the difference between the solubility products of sulfonic acid salts and of carboxylic acid salts.

Figure 2:
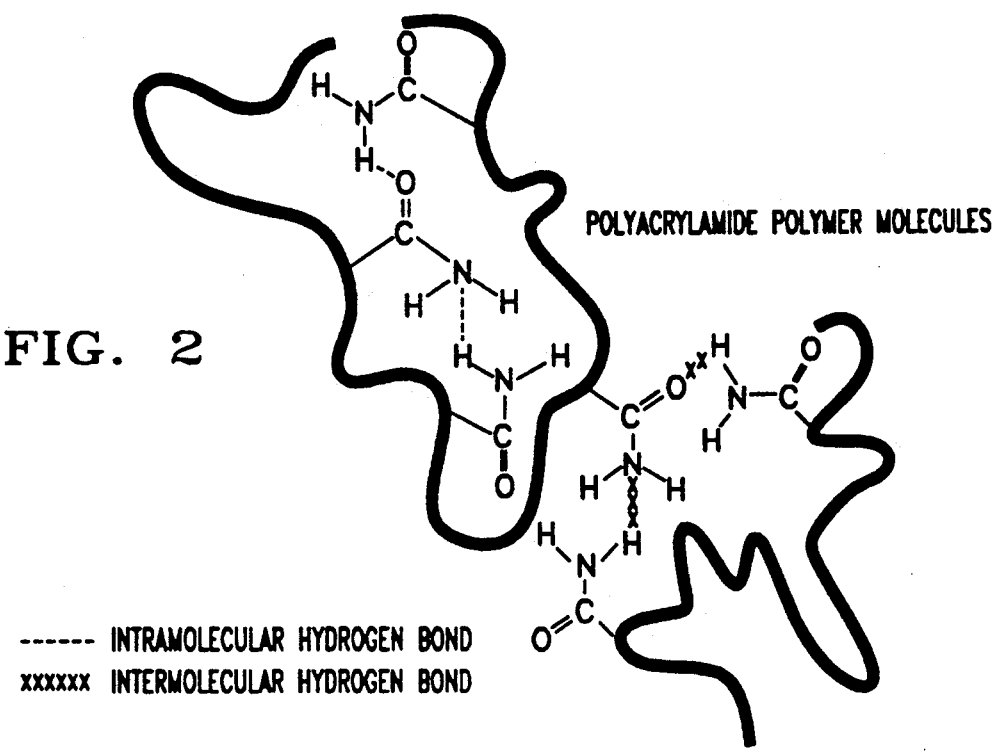
FIG. 2 is a schematic view which depicts hydrogen bonding.

Further, the primary ionic constituent of the superabsorbent polymer composition advantageously is capable of forming hydrogen bonds. Going now to FIG. 2 there is shown a schematic view of the mechanism of hydrogen bonding. Between different molecules, intermolecular hydrogen bonding occurs whereas within the same molecule, intramolecular hydrogen bonding occurs.

Using the water soluble polymer, polyacrylamide, as an example, polyacrylamide polymer chains once dissolved in water will exhibit two types of hydrogen bonding, intra- and intermolecular. Intramolecular hydrogen bonding tends to cause each individual polymer chain to become folded and curled. The molecular volume of such a polymer in water is small. The volume which the polymer chains occupy in aqueous solution may be called the hydrodynamic volume. The smaller the hydrodynamic volume, the closer the viscosity of the polymer solution approaches that of water. In other words, the polymer's influence on the water is small if the hydrodynamic volume of that polymer is small. In the case of polyacrylamide, for example, intermolecular hydrogen bonding pulls the polymer chains together. In summary, polymer chains not only curl by themselves, via intramolecular hydrogen bonding, they also bundle together via intermolecular hydrogen bonding. The effective hydrodynamic volume of polyacrylamide is therefore low, resulting in low viscosity.

It is well known that an amide can be hydrolyzed to a carboxylate. If the amide groups in polyacrylamide were hydrolyzed to carboxylate groups (i.e., the same functional groups in polyacrylates, or superabsorbent polymer), intermolecular as well as intramolecular charge repulsion exists between polymer chains. These repulsions extend the hydrodynamic volume of polyacrylates and result in a much higher viscosity and higher water absorbency. In fact, some low molecular weight polyacrylates are used as thickeners. Carboxylates also have a higher ability than amides in polyacrylamides to form hydrogen bonding with water molecules. Having numerous hydrogen bonding with water molecules, the superabsorbent polymer absorbs water into its network and retains it.

Figure 3:
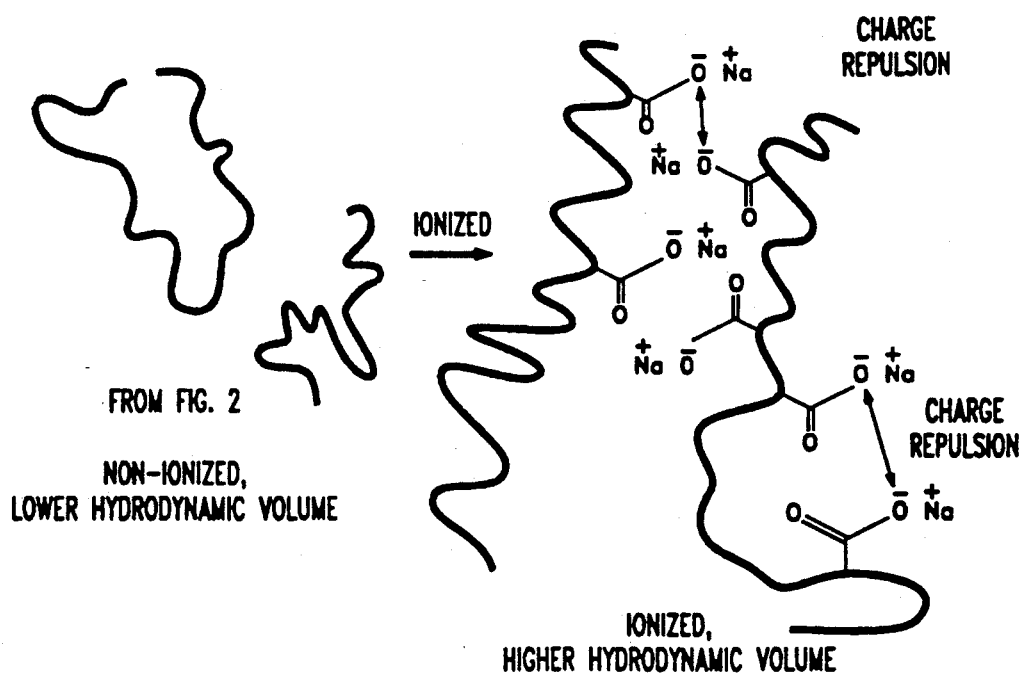
FIG. 3 is a schematic view which depicts hydrodynamic volume increase as a result of charge repulsion.

If hydrolysis of amides occurs as shown in FIG. 3, the molecules extend between polymer chains due to charge repulsion between newly created carboxylates. The polymer with carboxylates now occupies more volume in water solution which results in a higher viscosity. As a result, there are more polymer chains to occupy space and absorb water. On the other hand, with amides, there is a tendency to curl up and polymer chains are not extended to occupy more volume, resulting in a lower viscosity.

In a superabsorbent polymer, it is desired to have an ionic group occupy as much hydrodynamic volume as possible. The problem with a carboxylate type of superabsorbent polymer is that although it has a high volume and charge repulsion, in salt solutions, its water absorbency drops from about 900 ml/g to 70 ml/g in a 0.9% NaCl solution and to 8 ml/g in a synthetic sea water solution. See Table I.

TABLE I

WATER ABSORBENCY OF TYPICAL PRIOR ART SUPERABSORBENT POLYMER

| Unit | NaCl | MgCL$_2$ grams/liter | CaCl$_2$ | Na$_2$SO$_4$ | Water Absorbency ml/gram | Rate of Absorption sec |
|---|---|---|---|---|---|---|
| Distilled H$_2$O | | | | | 900 | 45–60 |
| 0.9% NaCl | 9 | | | | 70 | 100–120 |
| Synthetic [ASTM D1141] Sea Water (2.5% NaCl) | 24.53 | 5.2 | 1.16 | 4.09 | 8 | |

Figure 4:
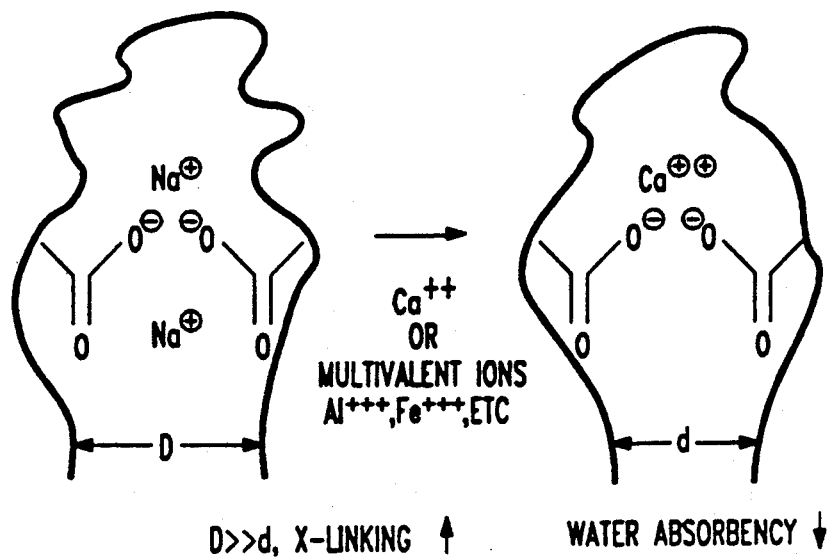
FIG. 4 is a schematic view which shows that a multivalent ion reduces the water absorbency of prior art superabsorbent polymers.

Shown in FIG. 4 is a typical property of carboxylate. Upon the addition of "multivalent salt" such as calcium chloride, a carboxylate-containing water soluble polymer will be crosslinked and precipitated to the bottom of a container because of the low disassociation constant of calcium carboxylate. As a result, its ability to absorb water will be decreased substantially. With carboxylate-containing superabsorbent polymers, complexation of the multiviolent ion causes crosslinking. Such complexation and crosslinking of the carboxylate by a multivalent salt upsets the optimum cross-linking needed in superabsorbent polymers, and the water absorbency is altered accordingly. An optimum amount of crosslinking is desired so that there is optimum space within the polymer matrix. Optimum space allows water to be taken in, so that the polymer is not soluble in water, and so that the matrix of the polymer will retain a maximum amount of water. The change in crosslinking occurs in addition to the drop in osmotic pressure gradient when superabsorbent polymers are exposed to any salt solution, not necessarily multivalent salts.

Figure 5:
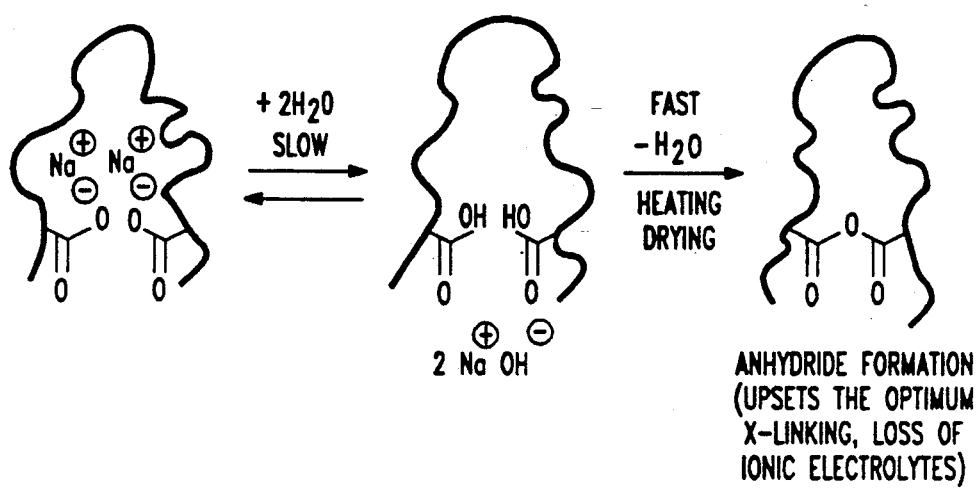
FIG. 5 is a schematic view which shows anhydride formation of superabsorbent polymers as a result of absorption and drying cycles.

The second problem which is solved by the superabsorbent polymer of this invention is that of temperature sensitivity. After heating and drying (see FIG. 5), the water absorbency of some prior art superabsorbent polymers decreases. It decreases because of the relatively large amount of carboxylates which are present in prior art superabsorbent polymers and which form anhydrides and thus crosslink. Too much crosslinking results in a decrease in water absorbency. The crosslinking of the superabsorbent polymer of this invention is controlled in order to achieve optimum water absorbency.

It is desired to use as little carboxylate as possible. In the superabsorbent polymer of this invention, a substantial portion of a carboxylate constituent so common in prior art superabsorbent polymers has been replaced with an ionic group selected from sulfate, sulfonate or phosphate. Of course, the superabsorbent polymer may include all three. However, carboxylate is not excluded altogether because it has excellent water absorbing capability via hydrogen bonding. Instead of a relatively large amount of carboxylate, a group such as sulfonate which forms sulfonic anhydride much less readily is used. As a result, the optimum level of crosslinking achieved during the making of the polymer is maintained. Water absorbency of such superabsorbent polymers will not be affected by temperature-induced crosslinking or decrosslinking. Sulfonic anhydride is formed much less readily because the acid disassociation constant is higher.

Figure 6:
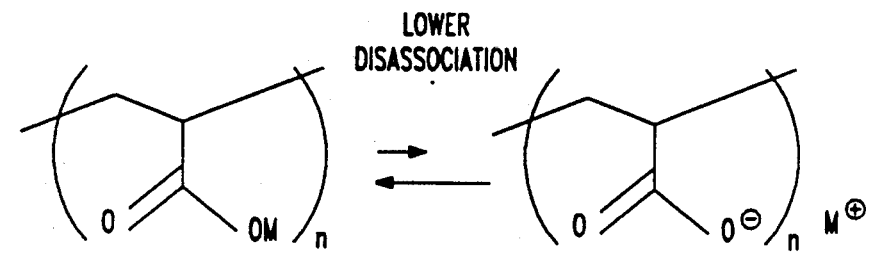
FIG. 6 is a schematic view which depicts superabsorbent polymers of this invention.
Figure 6:
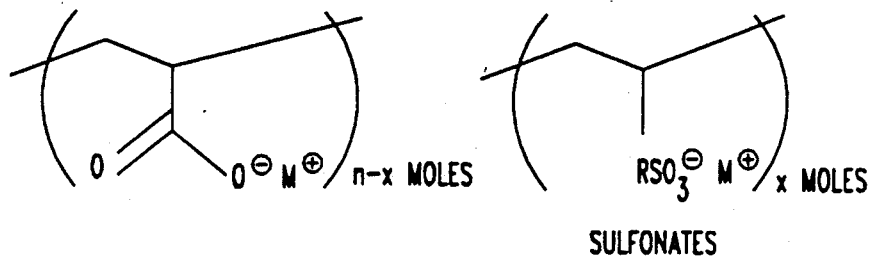

Referring now to FIG. 6, the top portion illustrates the ionic property of counter ions. The less ionic, the less the sensitivity towards salt solutions of superabsorbent polymer. Where the counter ion is ammonium, ammonium carboxylate is characterized as less ionic because of a lower disassociation constant. The lower portion of FIG. 6 illustrates the combination of sulfonates with carboxylates in a super-absorbent polymer of this invention.

It is to be understood that the above-described arrangements are simply illustrative of the invention. Other arrangements may be devised by those skilled in the art which will embody the principles of the invention and fall within the spirit and scope thereof.

I Claim:
1. A cable, which includes:
   a core comprising at least one communication transmitting medium; and
   a sheath system in which is disposed said core, said sheath system including at least one waterblocking member which comprises a superabsorbent polymer which is temperature and salt tolerant and which includes (1) an ionic constituent which is characterized in that its solubility product is substantially higher than that of carboxylate and in that it has a slower reaction rate for forming an anhydride than does carboxylate, and (2) a counter ion.

2. The cable of claim 1, wherein said ionic constituent is selected from the group consisting of sulfonate, sulfate and phosphate.

3. The cable of claim 1, which includes a constituent counter ion selected from the group consisting of ammonium, potassium, lithium, cesium, and sodium.

4. The cable of claim 1, which includes a counter ion selected from the group consisting of ammonium, potassium, lithium, and cesium.

5. The cable of claim 1, wherein said superabsorbent polymer also includes a carboxylate group.

6. The cable of claim 5, wherein said superabsorbent polymer also includes a nonionic group.

7. The cable of claim 6, wherein said superabsorbent polymer includes amide and carboxylate groups.

8. The cable of claim 6, wherein said superabsorbent polymer includes a nitrile group.

9. The cable of claim 6, wherein said superabsorbent polymer includes a hydroxyl group.

10. The cable of claim 6, wherein said superabsorbent polymer includes a hydroxyl group, an amide group and a nitrile group.

11. A superabsorbent polymer which retains substantially its superabsorbent capability notwithstanding exposure to solutions having a relatively high salt concentration and/or relatively high temperatures, said superabsorbent polymer comprising (1) an ionic constituent which is characterized in that its solubility product is substantially higher than that of carboxylate and in that it has a lower reaction rate for forming an anhydride than does carboxylate; and (2) a counter ion.

12. The superaborbent polymer of claim 11, wherein said ionic constituent is selected from the group consisting of sulfonate, sulfate and phosphate.

13. The superabsorbent polymer of claim 11, wherein said superabsorbent polymer also includes a ion selected from the group consisting of ammonium, potassium, lithium and cesium.

14. The superabsorbent polymer of claim 13, which also includes a non-ionic group.

15. The superabsorbent polymer of claim 13, which also includes a carboxylate group.

16. The polymer of claim 15, wherein said superabsorbent polymer also includes an amide group.

17. The superabsorbent polymer of claim 15, which also includes an nitrile group.

18. The superabsorbent polymer of claim 15, which also includes a hydroxyl group.

19. The superabsorbent polymer of claim 15, which also includes a hydroxyl, an amide and a nitrile group.

20. The superabsorbent polymer of claim 15, which includes a sulfonate group, a sulfate group and a phosphate group.

21. The superabsorbent polymer of claim 11, wherein said superabsorbent polymer includes a sulfate group, a phosphate group and a carboxylate group.

22. The superabsorbent polymer of claim 11, which includes a sulfate group, a phosphate group, an amide group and a carboxylate group.

23. The superabsorbent polymer of claim 11, which includes a sulfate group, a phosphate group, an amide group, a carboxylate group and a hydroxyl group.

24. An article which includes a superabsorbent polymer which retains substantially its superabsorbent capability notwithstanding exposure to solutions having a relatively high salt concentration and/or relatively high temperatures, said superabsorbent polymer comprising (1) an ionic constituent which is characterized in that its solubility product is substantially higher than that of carboxylate and in that it has a lower reaction rate for forming an anhydride than does carboxylate; and (2) a counter ion.

25. The article of claim 24, wherein said ionic constituent is selected from the group consisting of sulfonate, sulfate and phosphate.

26. The article of claim 24, wherein said superabsorbent polymer also includes a ion selected from the group consisting of ammonium, potassium, lithium and cesium.

27. The article of claim 26, which also includes a non-ionic group.

28. The article of claim 26, which also includes a carboxylate group.

29. The article of claim 28, wherein said superabsorbent polymer also includes an amide group.

30. The article of claim 28, which also includes an nitrile group.

31. The article of claim 28, which also includes a hydroxyl group.

32. The article of claim 28, which also includes a hydroxyl, an amide and a nitrile group.

33. The article of claim 28, which includes a sulfonate group, a sulfate group and a phosphate group.

34. The article of claim 24, wherein said superabsorbent polymer includes a sulfate group, a phosphate group and a carboxylate group.

35. The article of claim 24, which includes a sulfate group, a phosphate group, an amide group and a carboxylate group.

36. The article of claim 24, which includes a sulfate group, a phosphate group, an amide group, a carboxylate group and a hydroxyl group.

* * * * *

REEXAMINATION CERTIFICATE (3107th)
United States Patent
Sheu

[11] B1 5,163,115
[45] Certificate Issued Jan. 14, 1997

[54] CABLES SUCH AS OPTICAL FIBER CABLES INCLUDING SUPERABSORBENT POLYMERIC MATERIALS WHICH ARE TEMPERATURE AND SALT TOLERANT

[75] Inventor: Jim J. Sheu, Dunwoody, Ga.

[73] Assignee: American Telphone and Telegraph Company, New York, N.Y.

Reexamination Request:
No. 90/004,012, Nov. 13, 1995

Reexamination Certificate for:
Patent No.: 5,163,115
Issued: Nov. 10, 1992
Appl. No.: 785,601
Filed: Oct. 30, 1991

[51] Int. Cl.$^6$ .................................................. G02B 6/44
[52] U.S. Cl. ..................... 385/100; 528/71; 385/141
[58] Field of Search ............................ 385/100, 141, 385/14; 525/327.8, 328.9, 330.2; 526/272, 318.2, 318.41, 318.43, 318.45, 930; 528/71

[56] References Cited

FOREIGN PATENT DOCUMENTS

WO87/06069 10/1987 WIPO .
WO88/08440 11/1988 WIPO .
WO88/10001 12/1988 WIPO .

*Primary Examiner*—Brian Healy

[57] ABSTRACT

A cable (20) includes a waterblocking member (29) which includes a superabsorbent polymer. The superabsorbent polymer includes an ionic constituent which is characterized in that its solubility product is substantially higher than that of carboxylate and in that it has a lower reaction rate for forming an anhydride than does carboxylate. The ionic constitutent may be selected from the group consisting of sulfate, sulfonate and phosphate and also includes a counter ion. Other constituents may include a carboxylate and a non-ionic group constituent. The superabsorbent polymer is such that the amount of crosslinking is sufficient to avoid the polymer going into solution, but is not so much as to affect adversely the water absorbency of the water-blocking member. Further, the superabsorbent polymer is much more salt tolerant and temperature tolerant than are prior art superabsorbent polymers.

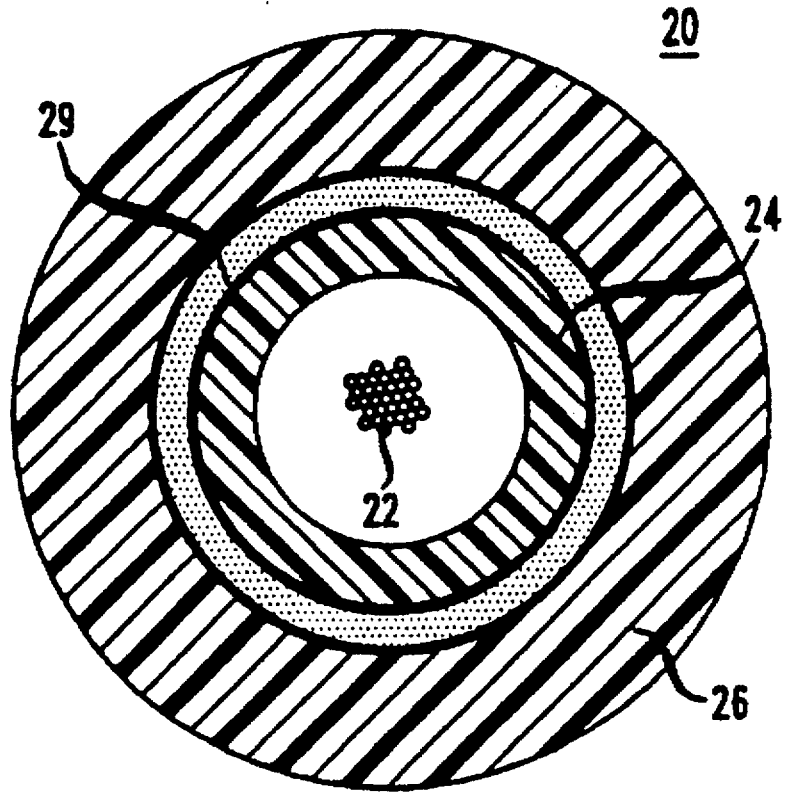

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11 and 24 are determined to be patentable as amended.

Claims 2-10, 12-23 and 25-36, dependent on an amended claim, are determined to be patentable.

1. A cable, which includes:

a core comprising at least one communication transmitting medium; and a sheath system in which is disposed said core, said sheath system including at least one waterblocking member which comprises a superabsorbent polymer which is temperature and salt tolerant and which includes (1) [an] *a monovalent* ionic constituent which is characterized in that its solubility product is substantially higher than that of carboxylate and in that it has a slower reaction rate for forming an anhydride than does carboxylate, and (2) a counter ion *wherein the concentrations of the ionic group and the counter ion are substantially equal*.

11. A superabsorbent polymer which retains substantially its superabsorbent capability notwithstanding exposure to solutions having a relatively high salt concentration and/or relatively high temperatures, said superabsorbent polymer comprising (1) [an] *a monovalent* ionic constituent which is characterized in that its solubility product is substantially higher than that of carboxylate and in that it has a lower reaction rate for forming an anhydride than does carboxylate; and (2) a counter ion *wherein the concentrations of the ionic group and the counter ion are substantially equal*.

24. An article which includes a superabsorbent polymer which retains substantially its superabsorbent capability notwithstanding exposure to solutions having a relatively high salt concentration and/or relatively high temperatures, said superabsorbent polymer comprising (1) [an] *a monovalent* ionic constituent which is characterized in that its solubility product is substantially higher than that of carboxylate and in that it has a lower reaction rate for forming an anhydride than does carboxylate; and (2) a counter ion *wherein the concentrations of the ionic group and the counter ion are substantially equal*.

* * * * *